US009249666B2

(12) United States Patent  
Wood et al.

(10) Patent No.: US 9,249,666 B2  
(45) Date of Patent: Feb. 2, 2016

(54) AIRFOILS FOR WAKE DESENSITIZATION AND METHOD FOR FABRICATING SAME

(75) Inventors: Trevor Howard Wood, Clifton Park, NY (US); Kishore Ramakrishnan, Clifton Park, NY (US); Umesh Paliath, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 965 days.

(21) Appl. No.: 13/334,609

(22) Filed: Dec. 22, 2011

(65) Prior Publication Data

US 2013/0164488 A1 Jun. 27, 2013

(51) Int. Cl.  
*F01D 5/14* (2006.01)  
*F01D 9/04* (2006.01)  
(Continued)

(52) U.S. Cl.  
CPC ............... *F01D 5/141* (2013.01); *F01D 9/041* (2013.01); *F03D 1/0633* (2013.01); *F04D 29/324* (2013.01); *F05B 2250/611* (2013.01); *F05D 2220/36* (2013.01); *F05D 2240/121* (2013.01); *F05D 2240/303* (2013.01); *F05D 2250/184* (2013.01); *F05D 2250/611* (2013.01); *Y02E 10/721* (2013.01); *Y02T 50/671* (2013.01); *Y02T 50/673* (2013.01); *Y10T 29/49316* (2015.01);  
(Continued)

(58) Field of Classification Search  
CPC ................ F01D 5/141; F05D 2240/30; F05D 2240/303; F04D 29/384; F03D 1/0633; F03D 1/0675  
USPC ........... 416/228, 235, 191, 236 R; 29/889.21, 29/889.22, 889.7  
See application file for complete search history.

(56) References Cited

U.S. PATENT DOCUMENTS 1,862,827 A 6/1932 Parsons et al.  
3,403,893 A * 10/1968 Stoffer .......................... 416/228  
(Continued)

FOREIGN PATENT DOCUMENTS

DE 93910 C 12/1896  
DE 4206066 A1 9/1993  
(Continued)

OTHER PUBLICATIONS

Search Report and Written Opinion from corresponding PCT Application No. PCT/US2012/069032 dated Aug. 1, 2013.  
(Continued)

*Primary Examiner* — Nathaniel Wiehe  
*Assistant Examiner* — Michael Sehn  
(74) *Attorney, Agent, or Firm* — John P. Darling

(57) ABSTRACT

An airfoil and method of fabricating an airfoil including a first and a second side coupled at a leading and a trailing edge and extending there between. The airfoil includes a plurality of first chord sections having a first chord length and extending outward from one of the first side or second side at the leading edge and a plurality of second chord sections having a second chord length and extending outward from the one of the first side or the second side at the leading edge. The leading edge including spaced-apart wave-shaped projections defining a waveform. The configuration defining a three-dimensional crenulated airfoil configured to facilitate desensitization of an airfoil unsteady pressure response to at least one impinging upstream generated wake or vortex by decorrelating spatially and temporally and reducing in amplitude an unsteady pressure caused by interaction of the airfoil with the upstream generated wake or vortex.

20 Claims, 10 Drawing Sheets

(51) Int. Cl.
F03D 1/06 (2006.01)
F04D 29/32 (2006.01)

(52) U.S. Cl.
CPC ...... Y10T 29/49321 (2015.01); Y10T 29/49323 (2015.01); Y10T 29/49332 (2015.01); Y10T 29/49336 (2015.01); Y10T 137/0536 (2015.04)

(56) References Cited

U.S. PATENT DOCUMENTS

| | | | |
|---|---|---|---|
| 5,337,568 | A | 8/1994 | Lee et al. |
| 5,860,626 | A | 1/1999 | Moser |
| 6,213,711 | B1 | 4/2001 | Mueller et al. |
| 6,341,942 | B1 * | 1/2002 | Chou et al. .................. 416/228 |
| 6,431,498 | B1 | 8/2002 | Watts et al. |
| 6,733,240 | B2 | 5/2004 | Gliebe |
| 6,994,521 | B2 | 2/2006 | Liang |
| 7,484,937 | B2 * | 2/2009 | Johann .................. 416/228 |
| 7,789,630 | B2 | 9/2010 | Schilling et al. |
| 7,976,283 | B2 | 7/2011 | Huck |
| 2006/0029500 | A1 | 2/2006 | Cherolis et al. |
| 2009/0013532 | A1 * | 1/2009 | Wood et al. .................. 29/889.7 |
| 2009/0074578 | A1 * | 3/2009 | Dewar et al. .................. 416/147 |
| 2012/0061522 | A1 | 3/2012 | Sullivan et al. |

FOREIGN PATENT DOCUMENTS

| | | |
|---|---|---|
| DE | 19634296 A1 | 4/1997 |
| DE | 102006058415 A1 | 6/2008 |
| DE | 202009003490 U1 | 6/2009 |
| DE | 102009035689 A1 | 2/2011 |
| EP | 2050929 A1 | 4/2009 |
| EP | 2204535 A2 | 7/2010 |
| FR | 910191 A | 5/1946 |
| GB | 789883 A | 1/1958 |
| GB | 791563 A | 3/1958 |
| GB | 1187076 A | 4/1970 |
| GB | 2105791 A | 3/1983 |
| WO | 9205341 A1 | 4/1992 |
| WO | 9844240 A1 | 10/1998 |
| WO | 03076797 A1 | 9/2003 |
| WO | 2006042401 A1 | 4/2006 |

OTHER PUBLICATIONS

Smith et al, "Cascade Tests of Serrated Leading Edge Blading at High Subsonic Speeds", National Aeronautics and Space Administration, pp. 1-36, Dec. 1974.

Polacsek et al., "Turbulence-airfoil Interaction Noise Reduction Using Wavy Leading Edge: An Experimental and Numerical Study", Internoise 2011, Osaka Japan, Sep. 2011.

* cited by examiner

AIRFOILS FOR WAKE DESENSITIZATION AND METHOD FOR FABRICATING SAME

BACKGROUND

Embodiments presented herein relate generally to aerodynamic surfaces configured for wake desensitization, and more specifically to configuration of a leading edge on an aerodynamic surface, such as an airfoil, for desensitization of unsteady pressure response to impinging wakes and vortices from upstream.

At least some known machines including aerodynamic surfaces such as, but not limited to, aircraft engines, gas turbine engines, and steam turbine engines, include a plurality of rotating airfoils and stationary airfoils which are subject to impinging wakes and vortices generated from an upstream object, such as an upstream blade row, or an input unsteady airflow. The upstream generated wakes and vortices are channeled downstream where they may impinge on the leading edge of downstream airfoils. In several instances, the wake flow impingement from upstream objects on the downstream airfoils moving relative to each other is a dominant source of aerodynamic noise and aeromechanical loading generated in turbomachinery applications. In some known rotary machines noise may be generated by an upstream rotating airfoil's wake impinging on a leading edge of a stationary or rotating airfoil located downstream, an upstream stator component's wake impinging on a leading edge of a rotating or stationary airfoil located downstream, or an upstream rotating airfoil's wake impinging on a leading edge of a counter-rotating airfoil located downstream. In some known engines, the wake flow may contain non-uniform temperature distributions.

Noise generated by aircraft engines may be constrained by international and local regulations, thereby creating a need to balance fuel efficiency and emissions with noise pollution. A dominant source of aerodynamic noise and aeromechanical loading generated in turbomachinery applications is the interaction of wakes from upstream blade rows on downstream blade rows or vanes moving relative to each other. Examples include fan wakes interacting with downstream outlet guide vanes (OGVs), contra-rotating open rotor noise generated by forward-aft rotor interaction, booster noise from fan wakes impinging on booster inlet guide vanes (IGVs), or the like. More particularly, an impinging wake flow on an airfoil's leading edge may result in an increase in noise radiated from the turbomachinery, as well as a potential increase in aeromechanical loading on the blade row. Desensitization by decorrelation in time of the unsteady pressure response as well as a reduction in the amplitude of the wake flow may reduce the noise and the aeromechanical loading generated when the wake impinges on the leading edge of the blade row or vane. At least some known methods of reducing the amplitude of the wake flow on a downstream airfoil include increasing the distance between the upstream object or airfoil and the downstream airfoil. This increased distance mixes the wake flow and thus reduces the amplitude of the wake flow impinging on the leading edge of the airfoil. However, increasing the distance between an upstream object and the downstream airfoil may increase the size, weight, and cost of the engine, and thereby reduces the efficiency and performance of the engine.

BRIEF DESCRIPTION

In accordance with one exemplary embodiment, disclosed is an airfoil including a first side and a second side coupled together at a leading edge and a trailing edge; a plurality of first chord sections defining at least one first chord length and a plurality of second chord sections defining at least one second chord length, the plurality of first chord sections and second chord sections defining a waveform along a leading edge of the airfoil, said leading edge comprises: a plurality of spaced-apart wave-shaped projections, each wave-shaped projection of said plurality of wave-shaped projections defines a wave tip and at least one trough portion defined between at least one pair of adjacent spaced-apart wave-shaped projections, wherein adjacent wave-shaped projections define a tip-to-tip distance therebetween, the tip-to-tip distance is within a range of values representative of a percentage of the at least one first chord length, wherein said wave-shaped projections are at least one of substantially evenly spaced and unevenly spaced, and wherein at least one chord section of said plurality of first chord sections extends outward from one of the first side or the second side of the airfoil at the leading edge, and at least one chord section of said plurality of second chord sections extends outward from one of the first side or the second side of the airfoil at the leading edge, the outwardly extending first and second chord sections and the plurality of spaced-apart wave-shaped projections defining a three-dimensional crenulated airfoil, and wherein the at least one airfoil is configured to facilitate desensitization of the airfoil unsteady pressure response to at least one impinging upstream generated wake or vortex by decorrelating (spatially and temporally) and reducing in amplitude an unsteady pressure caused by interaction of the airfoil with the upstream generated wake or vortex.

In accordance with another exemplary embodiment, disclosed is an airfoil for use in an engine, said airfoil comprising: a first side and a second side coupled together at a leading edge and a trailing edge; a plurality of first chord sections having a first thickness and defining at least one first chord length and a plurality of second chord sections having a second thickness and defining at least one second chord length, wherein each first chord section of said plurality of first chord sections is defined between each second chord section of said plurality of second chord sections and wherein the first chord length is longer than the second chord length defining a waveform along a leading edge of the airfoil, said leading edge comprises: a plurality of spaced-apart wave-shaped projections each wave-shaped projection of said plurality of wave-shaped projections defines a wave tip and at least one trough portion defined between at least one pair of adjacent spaced-apart wave-shaped projections, wherein adjacent wave-shaped projections define a tip-to-tip distance therebetween, the tip-to-tip distance is within a range of values representative of a percentage of the at least one first chord length, wherein said wave-shaped projections are at least one of substantially evenly spaced and unevenly spaced, and wherein at least one chord section of said plurality of first chord sections extends outward from one of said first side or said second side of the airfoil at the leading edge of the airfoil, and at least one chord section of said plurality of second chord sections extends outward from one of the first side or the second side of the airfoil at the leading edge, the outwardly extending first and second chord sections and the plurality of spaced-apart wave-shaped projections defining a three-dimensional crenulated airfoil, and wherein the at least one airfoil is configured to facilitate desensitization of the airfoil unsteady pressure response to at least one impinging upstream generated wake or vortex by decorrelating (spatially and temporally) and reducing in amplitude an unsteady pressure caused by interaction of the airfoil with the upstream generated wake or vortex and minimizing adverse effects of a high flow acceleration around the leading edge.

In accordance with another exemplary embodiment, disclosed is a method of fabricating an airfoil, said method comprising: fabricating at least one airfoil including a first side and a second side coupled together at a leading edge and a trailing edge, wherein the airfoil includes a plurality of first chord sections defining at least one first chord length and a plurality of second chord sections defining at least one second chord length, each extending between the trailing and leading edges and defining a waveform along a leading edge of the airfoil, said leading edge defines a length between a root portion of said airfoil and a tip portion of said airfoil, said leading edge comprises: a plurality of spaced-apart wave-shaped projections each wave-shaped projection of said plurality of wave-shaped projections defining a wave tip and at least one trough portion defined between at least one pair of adjacent spaced-apart wave-shaped projections, wherein adjacent wave-shaped projections define a tip-to-tip distance therebetween, the tip-to-tip distance is within a range of values representative of a percentage of the at least one first chord length, wherein said wave-shaped projections are at least one of substantially evenly spaced and unevenly spaced, and wherein at least one chord section of said plurality of first chord sections extends outward from one of the first side or the second side of the airfoil at the leading edge, and at least one chord section of the plurality of second chord sections extends outward from one of the first side or the second side of the airfoil at the leading edge, the outwardly extending first and second chord sections and the plurality of spaced-apart wave-shaped projections defining a three-dimensional crenulated airfoil; and wherein the at least one airfoil is configured to facilitate desensitization of an airfoil unsteady pressure response to at least one impinging upstream generated wake or vortex by decorrelating (spatially and temporally) and reducing in amplitude an unsteady pressure caused by interaction of the airfoil with the upstream generated wake or vortex.

DRAWINGS

The above and other aspects, features, and advantages of the present disclosure will become more apparent in light of the subsequent detailed description when taken in conjunction with the accompanying drawings in which.

DETAILED DESCRIPTION

Disclosed is an apparatus and method for fabricating an airfoil such as, but not limited to, for use in a rotary device. The embodiments described herein are not limiting, but rather are exemplary only. It should be understood that the disclosed embodiments may apply to any type of airfoil or aerodynamic surface, such as, but not limited to, fan blades, rotor blades, stator vanes, ducted fan blades, unducted fan blades, struts, vanes, nacelle inlets, open rotor propulsion systems, wind turbine blades, propellers impellers, diffuser vanes, and/or return channel vanes. More specifically, the disclosed embodiments may apply to any airfoil, or aerodynamic surface, that is subject to impinging wakes and vortices generated upstream of the airfoil.

Although the disclosed embodiments described herein is described in connection with a turbine engine or turbomachinery, it should be apparent to those skilled in the art that, with appropriate modification, the apparatus and methods of the disclosed embodiments can be suitable for any device including airfoils that are subject to impinging wakes and vortices generated upstream of the airfoil, such as aircraft structures and wings, including but not limited to, a flap leading edge, a wing leading edge behind a deployed slat, a landing gear fairing, or the like, as means to address unsteady surface pressure response.

Figure 1:
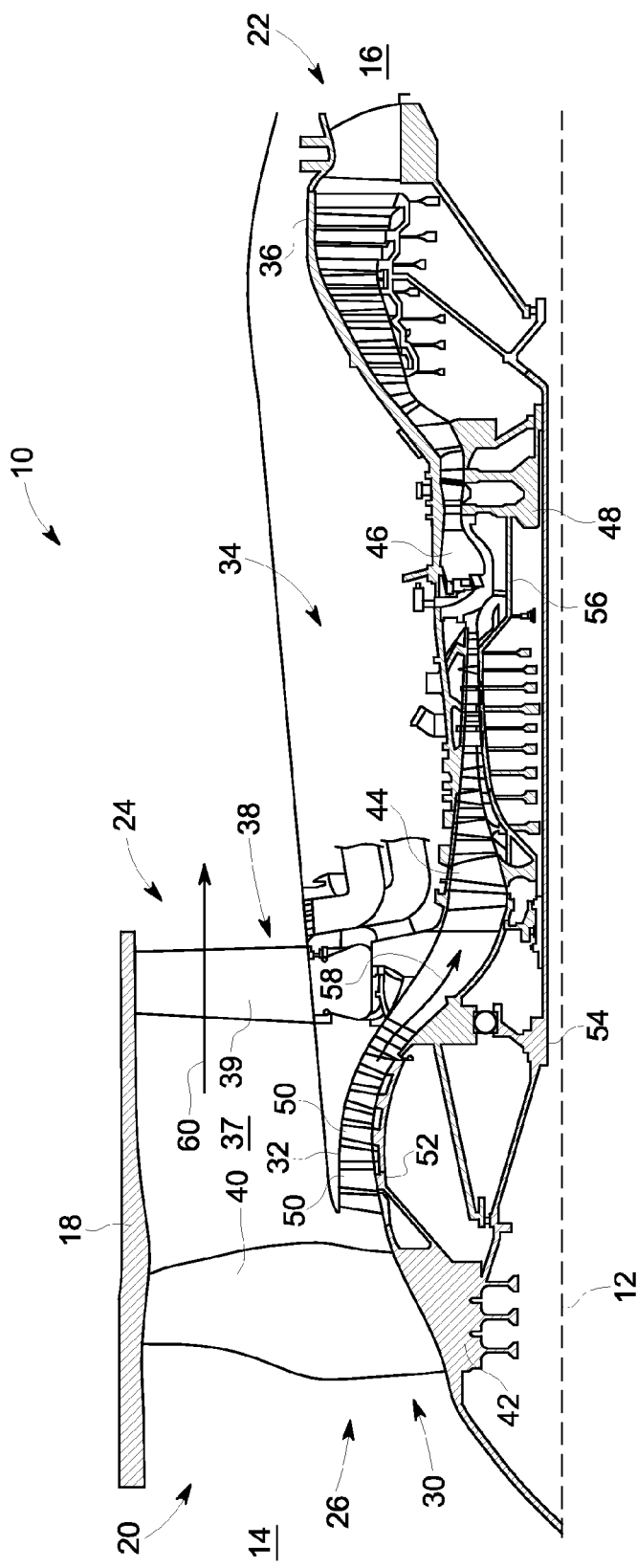
FIG. 1 is a schematic illustration of an exemplary turbine engine.

FIG. 1 is a schematic illustration of an exemplary turbofan gas turbine engine assembly 10 having a longitudinally extending axis or centerline 12 that extends through the engine assembly 10 from front to back (from left to right on FIG. 1). Flow through the illustrated exemplary engine is generally from front to back. The direction parallel to the centerline toward the front of the engine and away from the back of the engine will be referred to herein as the "upstream" direction 14, while the opposite direction parallel to the centerline will be referred to herein as the "downstream" direction 16.

The engine assembly 10 has an outer shell, or nacelle 18, that generally defines the engine. The engine assembly 10 also includes an intake side 20, a core engine exhaust side 22, and a fan exhaust side 24. The intake side 20 includes an intake 26 located at front opening of the nacelle 18, and flow into the engine enters through the intake 26. The fan exhaust side 24 includes an exhaust, or nozzle, (not shown) located at the aft end of the nacelle 18. Flow exits the engine assembly 10 from the exhaust.

A core engine is disposed inside the nacelle 18 and includes a fan assembly 30, a booster compressor 32, a core gas turbine engine 34, and a low-pressure turbine 36 that is coupled to the fan assembly 30 and the booster compressor 32. The fan assembly 30 includes a plurality of rotor fan blades 40 that extend substantially radially outward from a fan rotor disk 42. The core gas turbine engine 34 includes a high-pressure compressor 44, a combustor 46, and a high-pressure turbine 48. The booster compressor 32 includes a plurality of rotor blades 50 that extend substantially radially outward from a compressor rotor disk 52 coupled to a first drive shaft 54. The high-pressure compressor 44 and the high-pressure turbine 48 are coupled together by a second drive shaft 56.

Figure 2:
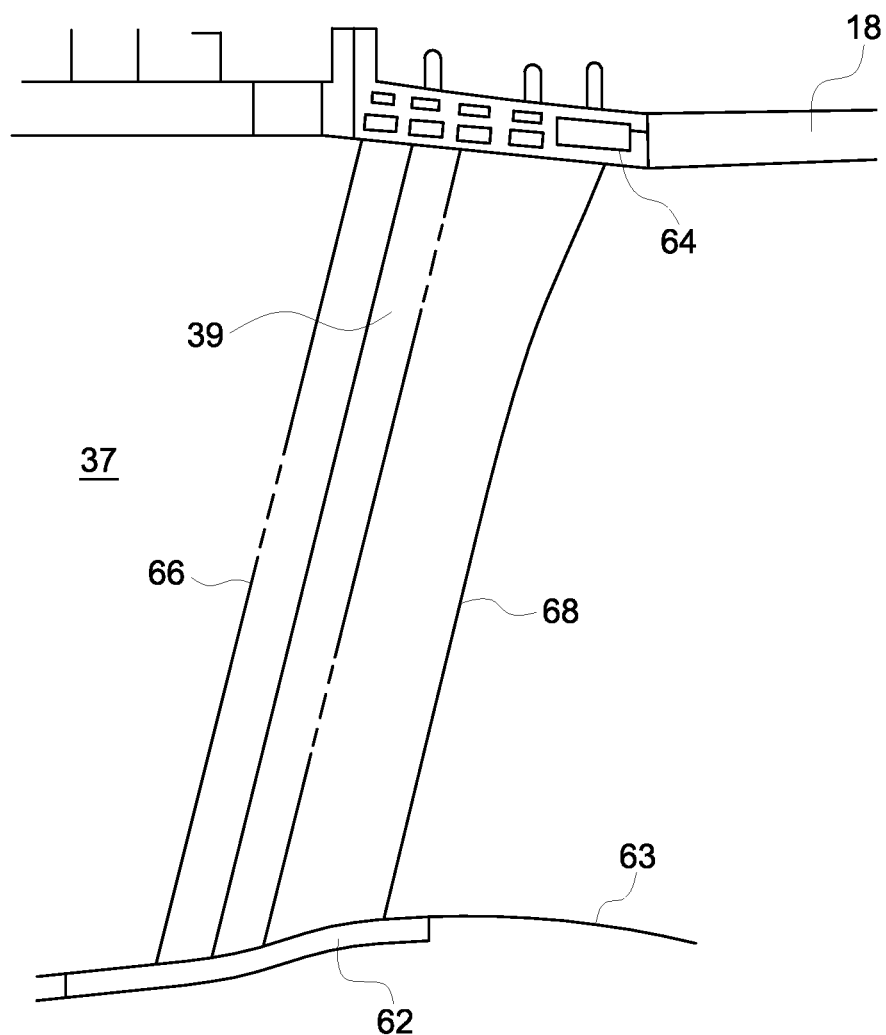
FIG. 2 is an enlarged view of a portion of the engine shown in FIG. 1.

During operation, air entering the engine assembly 10 through the intake side 20 is compressed by the fan assembly 30. The airflow exiting the fan assembly 30 is split such that a portion of the airflow, and more particularly a compressed airflow 58 is channeled into the booster compressor 32 and a remaining portion 60 of the airflow bypasses the booster compressor 32 and the core turbine engine 34 and exits the engine assembly 10 through a stationary vane row, and more particularly an outlet guide vane assembly 38, comprising a plurality of airfoil guide vanes 39, at the fan exhaust side 24. More specifically, a circumferential row of radially extending airfoil guide vanes 39 are utilized adjacent fan assembly 30 to exert some directional control of the air flow 60. One such airfoil guide vane is illustrated in FIG. 2. The plurality of rotor blades 50 compress and deliver the compressed airflow 58 towards the core gas turbine engine 34. The airflow 58 is further compressed by the high-pressure compressor 44 and is delivered to the combustor 46. The airflow 58 from the combustor 46 drives the rotating turbines 36 and 48 and exits the engine assembly 10 through the core exhaust side 22.

In FIG. 2, illustrated is the stationary guide vane, and more particularly the airfoil guide vane 39 configured as one of a circumferential row of radial guide vanes extending across an annular space 37 of FIG. 1 from a central circumferential part 62 of an engine casing 63 to engage a circumferential part 64 at the engine fan casing, or nacelle, 18. Circumferential parts 62 and 64 may be circular rim or band structures or arcuate segments thereof referred to as vane support platforms. In a final outlet guide vane assembly 38 circumferential part 64 comprises a plurality of adjacent vane platform segments (not shown) which together form the outer ring structure or part 64 to support a circular row of the radially extending vanes 39. The guide vane 39 includes an airfoil leading edge 66 and an airfoil trailing edge 68.

Figure 3:
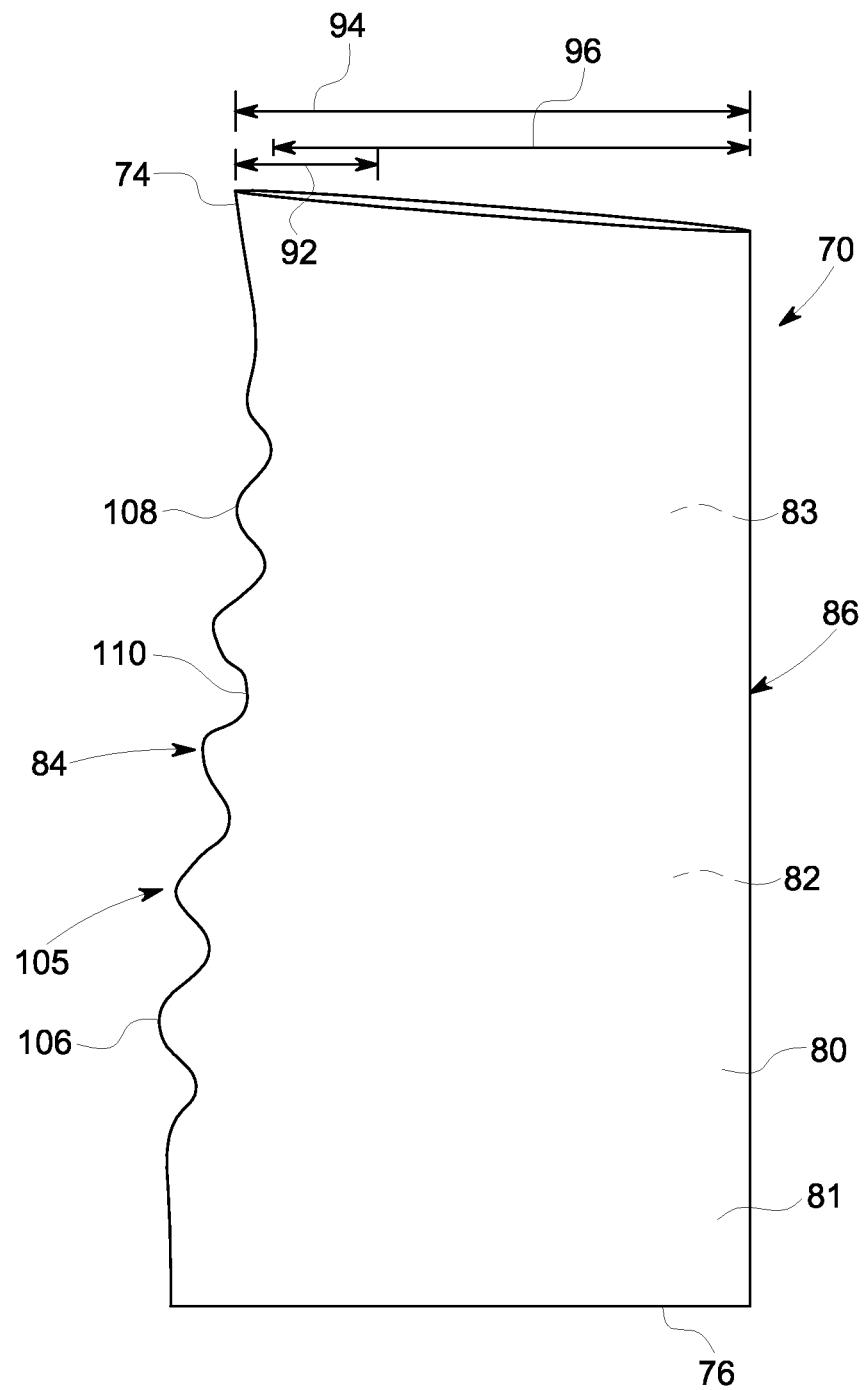
FIG. 3 is a perspective view of an airfoil that may be used with the engine shown in FIG. 1.
Figure 4:
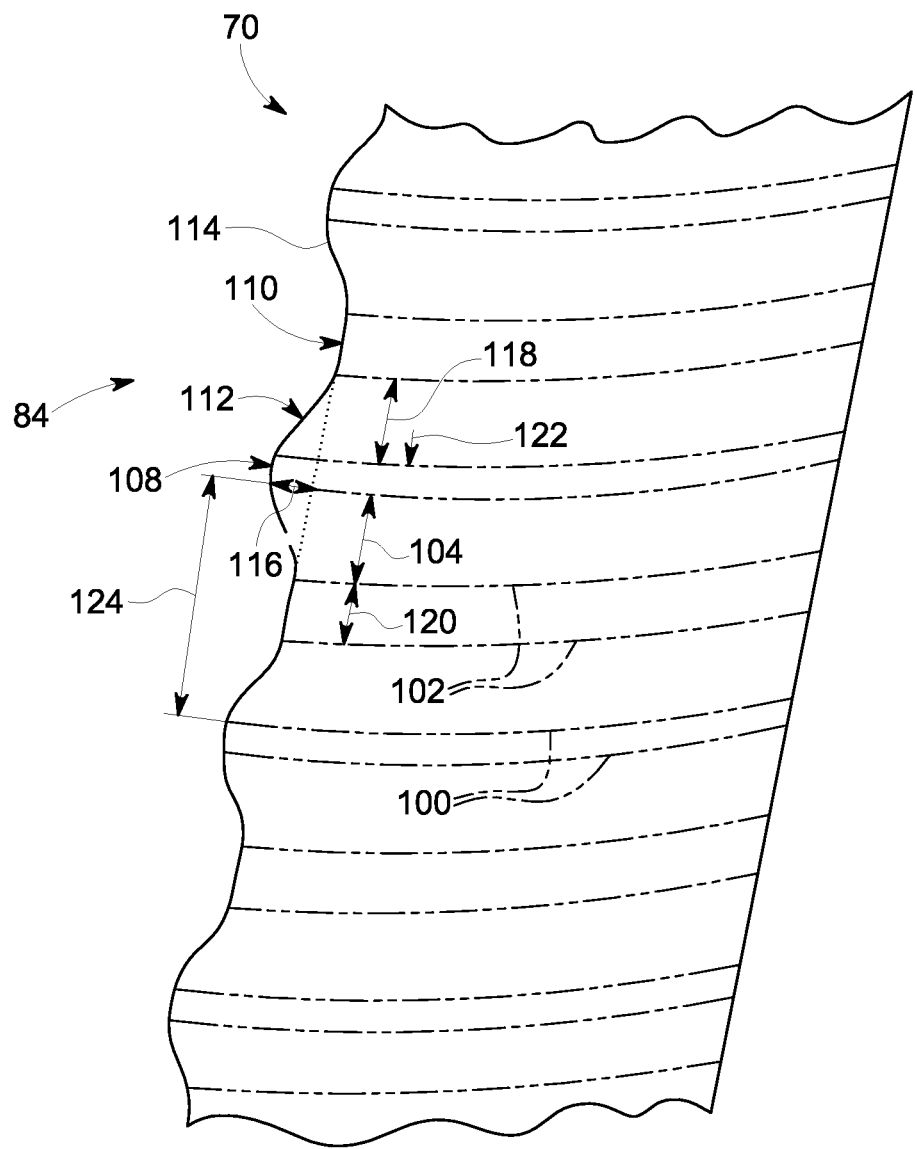
FIG. 4 is an enlarged view of a portion of the airfoil shown in FIG. 3.

FIG. 3 is a perspective view of one embodiment of an airfoil 70, and more particularly an outlet guide vane, generally similar to the outlet guide vane 39 of FIGS. 1 and 2 that may be used in an engine assembly, generally similar to the engine assembly 10 of FIG. 1. FIG. 4 is an enlarged view of a portion of the exemplary airfoil 70. In an embodiment, the airfoil 70 includes a tip portion 74, and a root portion 76. Alternatively, the airfoil 70 may be used with, but not limited to, rotor blades, and/or stator vanes/blades. The airfoil 70 includes a first side, and more specifically a first contoured sidewall 80 and a second side, and more specifically a second contoured sidewall 82. Specifically, in an embodiment, the first contoured sidewall 80 defines a pressure side 81 of the airfoil 70, and the second contoured sidewall 82 defines a suction side 83 of the airfoil 70. The sidewalls 80 and 82 are coupled together at a leading edge 84 and at a trailing edge 86 spaced one of axially or chord wise in a downstream direction from the leading edge 84. The trailing edge 86 is spaced chord-wise and downstream from the leading edge 84. The pressure side 81 and the suction side 83, and more particularly first contoured sidewall 80 and second contoured sidewall 82, respectively, each extend outward spanwise, from the root portion 76 to the tip portion 74.

In an embodiment, because of its design, and as explained in more detail below, the airfoil 70 includes a plurality of first chord sections 100 and a plurality of second chord sections 102 as shown in FIG. 4. The first chord sections 100 and the second chord sections 102 extend generally chord-wise between the leading edge 84 and the trailing edge 86. As described in more detail below, each first chord section 100 is radially-spaced a distance 104 away from an immediately adjacent second chord section 102. In an embodiment, at least one first chord section 100 is formed with a chord length 94 that is longer than a chord length 96 of at least one second chord section 102 thereby defining a waveform 105, defined by plurality of waves 106, along the leading edge 84 as illustrated in FIG. 3. Specifically, in an embodiment, each first chord section 100 defines a wave tip 108 along the leading edge 84. Similarly, each second chord section 102 defines a wave trough 110 along the leading edge 84. As a result, in an embodiment, the plurality of alternating first chord sections 100 and second chord sections 102, define the waves 106, and thus the wave-like pattern or waveform 105 extending along the leading edge 84. In an alternate embodiment, the at least one first chord section 100 and the at least one second chord section 102 are formed having a chord length 94 and a chord length 96, respectively, that are of equal length as described with regard to FIG. 11, and including at least one of a camber, thickness, or stacking wave defined by spanwise stacking of the first chord sections 100 and second chord sections 102 relative to each other.

In an embodiment, the waves 106 each include a radially inner edge 114 and a radially outer edge 112. Moreover, the leading edge 84 is defined by the plurality of wave tips 108 and by the plurality of wave troughs 110. More specifically, each wave tip 108 is defined on a respective first chord section 100. Similarly, each wave trough 110 is defined on a respective second chord section 102. As a result, in an embodiment, each wave tip 108 extends, in a chord-wise direction, a distance 116 upstream from each wave trough 110. Moreover, in an embodiment, each radially inner edge 114 and radially outer edge 112 extends generally radially between a wave tip 108 and a wave trough 110.

In an embodiment, the number of alternating adjacent first chord sections 100 and second chord sections 102 determines the number of waves 106 defined along the leading edge 84. Specifically, in an embodiment, each second chord section 102 is separated by a distance 118 from each first chord section 100, measured with respect to the radially outer edge 112. Similarly, in an embodiment, each first chord section 100 is separated by a distance 104 from each second chord section 102 measured with respect to the radially inner edge 114. Alternatively, the distances 104 and 118 may be substantially zero such that the radially inner and outer edges 112 and 114, respectively, extend substantially chord-wise between the wave tip 108 and the wave trough 110. In an embodiment, the distances 104 and 118 are approximately equal. In an alternative embodiment, the distance 104 may not be equal to the distance 118. In such an embodiment, the partial spanwise wavelength 104 of the radially inner edge 114 is not substantially equal to the partial spanwise wavelength 118 of the radially outer edge 112. In another embodiment, the radially inner edge 114 and the radially outer edge 112 may have any plan shape that extends between the wave tip 108 and the wave trough 110 including, but not limited to, a straight edge and a sinusoidal edge. The waves 106 may be designed to maintain an appropriate local average chord, camber and stacking (e.g. dihedral) such that the aerodynamic performance of airfoil 70 is not penalized.

In an embodiment, the waves 106 extend in a span-wise direction from the root portion 76 to the tip portion 74 on the leading edge 84 of the airfoil 70. In an alternative embodiment, the waves 106 may only partially extend in a span-wise direction along the leading edge 84 of the airfoil 70 (described presently). In another embodiment, the airfoil 70 may include at least one group of waves 106 extending at least partially, in a span-wise direction, along the airfoil 70 (described presently).

In the embodiment illustrated in FIG. 4, the wave trough portion 110 has a length 120 that extends generally along the leading edge 84. Similarly, in an embodiment, the wave tip portion 108 has a length 122 that extends generally along the leading edge 84. Alternatively, the length 120 of the wave trough portion 110 may be substantially zero such that the wave trough portion 110 is substantially a transition point defined between the radially inner edge 114 and the radially outer edge 112. In another embodiment, the length 122 may be substantially zero such that the wave tip portion 108 is substantially a transition point defined between the radially inner edge 114 and the radially outer edge 112.

The plurality of waves 106 are each fabricated with a pre-determined aspect ratio that represents a ratio of distance 116 with respect to a tip-to-tip distance 124. In an embodiment, the distance 116 is the distance between the first chord length 94 (shown in FIG. 3) and the second chord length 96 (shown in FIG. 3). In an embodiment, distance 116 may be substantially zero where only a camber wave is included.

Figure 5:
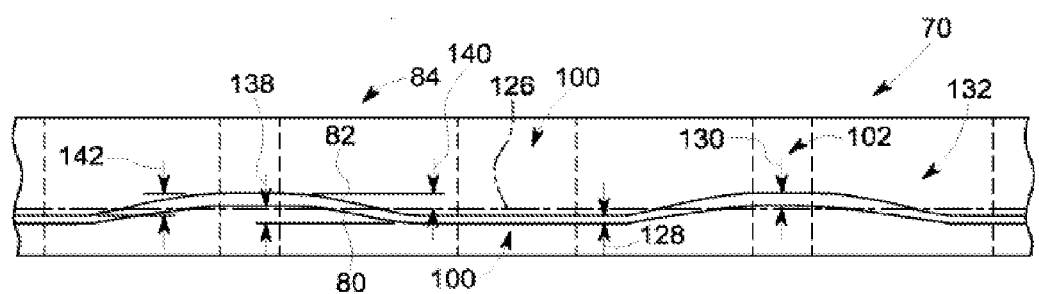
FIG. 5 is a cross-sectional end view of a portion of the airfoil shown in FIG. 3.
Figure 6:
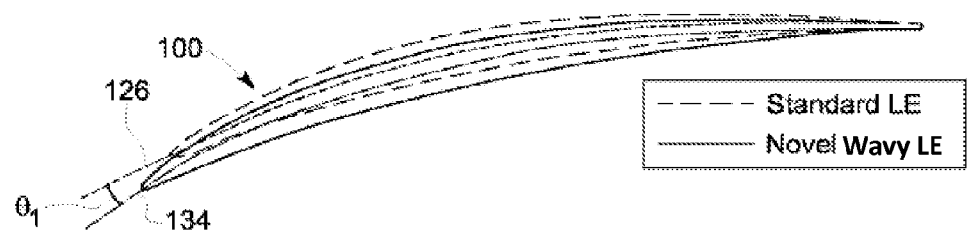
FIG. 6 is a cross-sectional view of a first chord section of the airfoil shown in FIG. 3.
Figure 7:
FIG. 7 is a cross-sectional view of a second chord section of the airfoil shown in FIG. 3.

FIG. 5 is a cross-sectional end view of a portion of the leading edge 84 of the airfoil 70 of FIG. 3. FIGS. 6 and 7 are cross-sectional span-wise views of the airfoil 70 taken through a long chord section 100 and a short chord section 102, respectively as compared to a standard leading edge airfoil. In an embodiment, the airfoil 70 is also formed with a mean camber line 126 extending in a chord-wise direction from the leading edge 84 to the trailing edge 86, such that the mean camber line 126 is equidistant from both the first contoured wall 80 or the airfoil pressure side 81 and the second contoured sidewall 82 or the suction side 83. In an embodiment, the airfoil 70 also has a thickness measured between the first contoured sidewall 80 and the second contoured sidewall 82. Specifically, in an embodiment, the airfoil 70 has a first chord thickness 128 defined on at least one first chord section 100, and a second chord thickness 130 defined on at least one second chord section 102. In an embodiment, the first chord thickness 128 is greater than the second chord thickness 130. Additionally, in an embodiment, the second chord thickness 130 is wider than the first chord thickness 128. The airfoil 70 has formed a plurality of camber waves 132, defined hereafter by both airfoil camber in the streamwise direction and/or stacking in the spanwise direction, in a span-wise direction defined substantially between the leading edge 84 and trailing edge, thereby defining a three-dimensional crenulated airfoil 70.

In an embodiment shown in FIG. 5, the first chord sections 100 and the second chord sections 102 are each formed with a respective camber line 134 and 136 at leading edge 84 with respect to the airfoil mean camber line 126. More specifically, the first chord camber line 134 is oriented at an angle $\theta_1$ with respect to the mean camber line 126. The orientation of the first chord camber line 134 causes the wave tip 108 to extend a distance 138 into a flow path (not shown) of one of the first contoured sidewall 80, the pressure side 81, or the second contoured sidewall 82, or the suction side 83, wherein the distance 138 is measured between the mean camber line 126 and the first contoured sidewall 80. Similarly, the second chord camber line 136 is oriented at an angle $\theta_2$ with respect to mean camber line 126. The orientation of the second chord camber line 136 causes the wave trough 110 to extend a distance 140 into a flow path (not shown) of one of the first contoured sidewall 80, the pressure side 81, or the second contoured sidewall 82, or the suction side 83, wherein a distance 140 is measured between the mean camber line 126 and the second contoured sidewall 82. At certain operating conditions of interest, the chord variations introduced by the wavy leading edge features may cause high flow acceleration at the leading edge (referred to herein as a leading edge suction peak) of the second chord section 102 due to the aerodynamic influence of the adjacent first chord sections 100. This flow acceleration may limit the effectiveness of the wavy leading edge and possibly cause a detrimental effect on noise. Hence, it is essential to mitigate the leading edge suction peak of the second chord section 102 via appropriate design. In one embodiment, as shown in FIGS. 6 and 7, to mitigate the leading edge suction peak of the second chord section 102, the wavy leading edge of the first chord section 100 and the second chord section 102 may be oriented downward with respect to a standard leading edge airfoil as shown in dotted line and may include a curvature near the wavy leading edge that is greater than that of an airfoil including the standard leading edge. Configuring the first chord sections 100 and second chord sections 102 accordingly enables leading edge suction peak to be minimized and leads to desensitization of airfoil unsteady pressure response to impinging wakes and vortices, resulting in a decrease in generated noise. It is obvious to one skilled in the art that alternate embodiments of mitigating the high leading edge flow acceleration may also be accomplished via other geometric design parameters, such as through thickness modifications.

Figure 8:
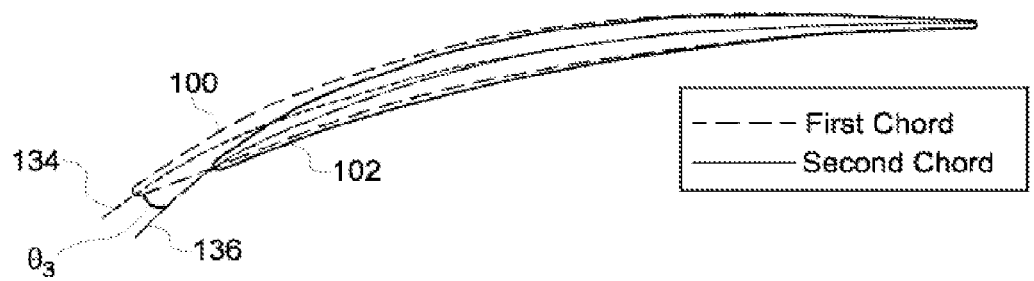
FIG. 8 is a cross-sectional view of the first and second chord sections of the airfoil shown in FIG. 3.

In an embodiment, a distance 142 is measured between the second contoured sidewall 82 of the wave tip portion 108 and the second contoured sidewall 82 of the wave trough portion 110. Moreover, in an embodiment, a distance 142 defined on the leading edge 84 can be further increased by increasing the angular distance $\theta_3$ at the leading edge 84 between the first chord camber line 134 and the second chord camber line 136 as detailed in FIG. 8. As described in more detail below, increasing the distance 142 facilitates reduction of the unsteady air pressures caused by wakes impinging upon the leading edge 84 of the airfoil 70. More specifically, increasing the distance 142 may facilitate decorrelation of the unsteady pressures and reduction of the amplitude of the airfoil unsteady pressure response to impinging wakes and vortices upon the airfoil 70, which facilitates noise and aeromechanical loading reduction. In an embodiment, changing the second chord thickness 130 may facilitate controlling or mitigating the leading edge suction peak. A well designed leading edge 84 may mitigate a leading edge suction peak and concomitant noise penalty at the second chord sections 102, improving overall wavy leading edge effectiveness. The airfoil 70 is thus configured to facilitate desensitization of the airfoil unsteady pressure response to at least one impinging unsteady wake by decorrelating (spatially and temporally) and reducing in amplitude the unsteady pressure caused by interaction with the upstream generated wake or vortex and minimizing high flow acceleration around the leading edge 84. In addition, the inclusion of the wavy leading edge features enables a change in time-averaged and unsteady surface pressure fields, thereby reducing generated noise.

During engine operation, a plurality of fan blades, such as the fan blades 40 of FIG. 1 rotate about the axis 12 (FIG. 1) such that the airflow 60 impinges on the leading edges 84 of the airfoils 70 of an outlet guide vane assembly. More specifically, the airflow 60 impinges upon the waves 106 and camber waves 132 and is channeled over each airfoil 70 in a downstream direction. As the airflow 60 impinges upon the waves 106 and the camber waves 132, decorrelation of the airfoil unsteady pressure response to impinging non-uniform airflow 60 is achieved. More specifically, decorrelation of the unsteady gust interaction with the airfoil may lead to reduction in the amplitude of the resulting unsteady surface pressures, thereby reducing the noise levels radiated by the airfoil 70.

As the airflow 60 impinges upon the leading edge 84 of the airfoil 70, decorrelation of the airfoil unsteady pressure response takes place in a number of ways: (i) the arrival time of the vorticity in the incident airflow 60 is modified by the physical location of the interacting leading edge 84; (ii) the airfoil surface unsteady pressure at the leading edge 84 is spatially less coherent (than a conventional leading edge), thus the surface pressure of the airfoil 70 responds differently than for a conventional leading edge with adverse effects of the leading edge suction peak at sections 102 being minimized; and (iii) the airfoil 70 mean loading is altered by the wavy leading edge 84 such that the unsteady response about the modified mean loading is less coherent. Note that even if wavy variations in the arrival time of the incident vorticity at the leading edge were somehow (artificially) removed, the wavy leading edge may still respond with a lower unsteady pressure relative to a conventional leading edge due to the curved leading edge and wavy airfoil surface itself.

Figure 9:
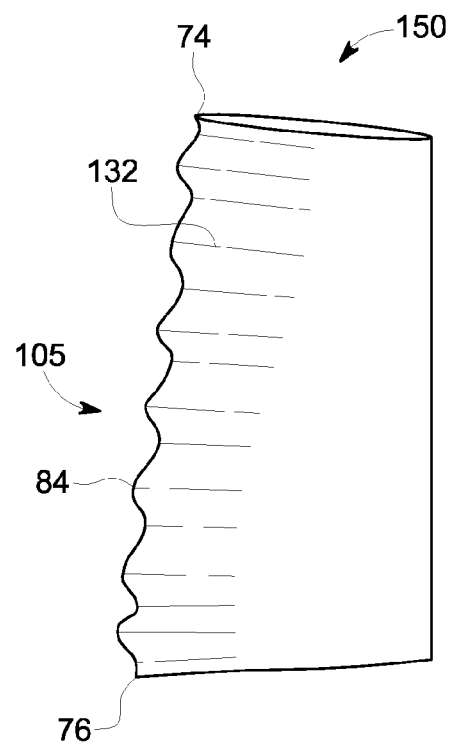
FIG. 9 is a schematic plan view of an airfoil according to an embodiment.
Figure 10:
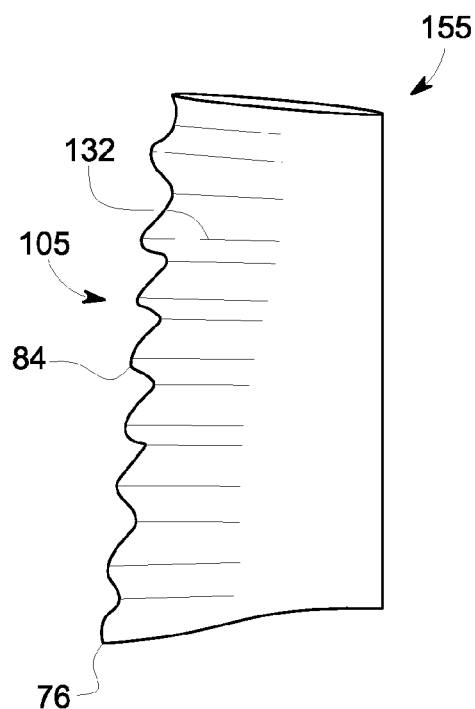

Referring now to FIGS. 9 and 10 illustrated in schematic plan views are various airfoil configurations according to embodiments disclosed herein. More particularly, illustrated in FIG. 9 is a schematic plan view of an airfoil 150, generally similar to previously described airfoil 70 of FIGS. 3-8. In the illustrated embodiment, airfoil 150 includes a waveform 105 on a leading edge 84 and plurality of camber waves 132, both formed along substantially an entire length of the airfoil 70 in a span-wise direction. More specifically, the waveform 105 and camber waves 132 create a three-dimensional airfoil extending from the tip portion 74 to the root portion 76. In this illustrated embodiment, the plurality of waves 106 that comprise the waveform 105 and camber waves 132 are formed substantially evenly along substantially the entire length of the airfoil in the span-wise direction. As previously described, the waves 106 are substantially equal, such that the partial spanwise wavelength 104 of the radially inner edge 114 (FIG. 4), is substantially equal to the partial spanwise wavelength 118 of the radially outer edge 112 (FIG. 4). An alternate embodiment as illustrated in FIG. 10 may include substantially unevenly spaced wave configurations. In another embodiment, the waveform may be applied to the entire leading edge, resulting in larger noise and aeromechanical loading benefits.

Illustrated in FIG. 10 is a schematic plan view of an alternate airfoil 155, generally similar to previously described airfoil 70 of FIGS. 3-8. In the illustrated embodiment, airfoil 155 includes a waveform 105 on a leading edge 84 and a plurality of camber waves 132, both formed along a substantial portion of the length of the airfoil 70 in a span-wise direction. More specifically, the waveform 105 and camber waves 132 create a three-dimensional airfoil extending from the tip portion 74 to the root portion 76 in the span-wise direction. In this illustrated embodiment, the plurality of waves 106 that comprise the waveform 105 and camber waves 132 are formed substantially unevenly along substantially the entire length of the airfoil 70 in the span-wise direction. More specifically, as previously described, the partial spanwise wavelength 104 of the radially inner edge 114 (FIG. 4) is not substantially equal to the partial spanwise wavelength 118 of the radially outer edge 112 (FIG. 4). Using an asymmetric waveform can improve the decorrelation of unsteady pressure response generated by the airfoil to impinging wakes and vortices from upstream. In an alternate embodiment, the plurality of waves 106 may be formed substantially unevenly along only a portion of the length of the airfoil 70 in the span-wise direction such as formed at a central portion or a distal, or tip end of the airfoil 70.

Figure 11:
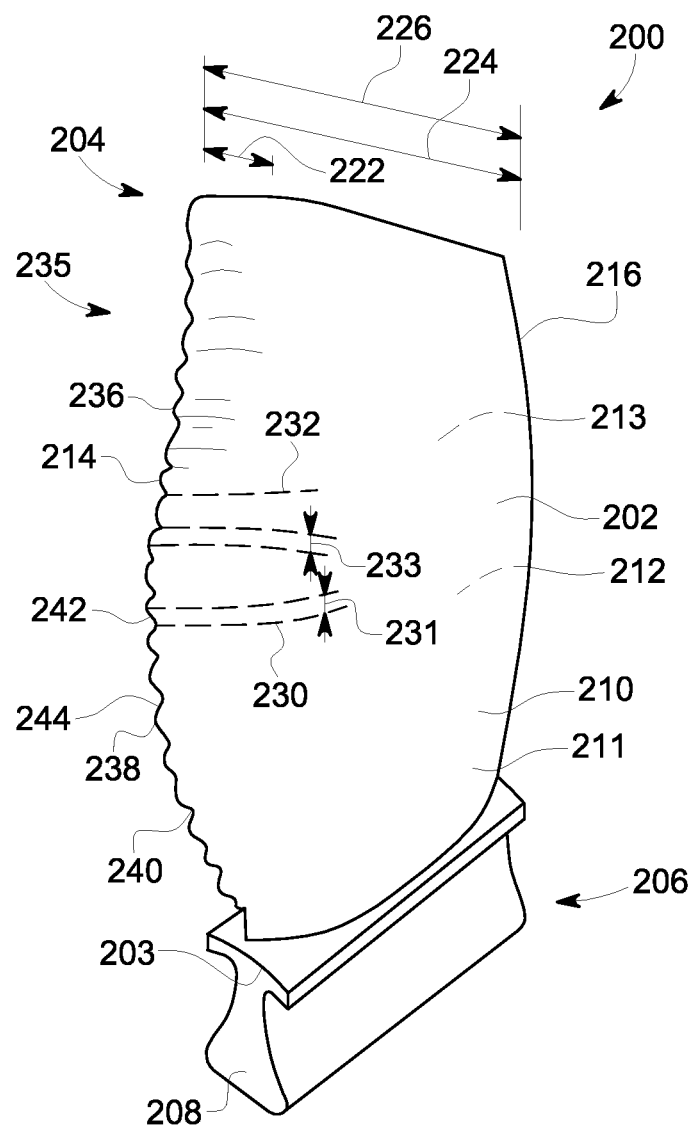
FIG. 11 is a perspective view of another embodiment of an airfoil that may be used with the engine shown in FIG. 1.

FIG. 11 is a perspective view of one embodiment of aerodynamic surface embodying the wavy leading edge as disclosed herein. More particularly, illustrated is a fan blade 200, generally similar to the fan blade 40 of FIG. 1 that may be used in an engine assembly, generally similar to the engine assembly 10 of FIG. 1. In an embodiment, the fan blade 200 includes an airfoil 202, a platform 203 and a root portion 206. Alternatively, the airfoil 202 may be used with, but not limited to, rotor blades, stator blades, and/or nozzle assemblies. In an embodiment, the root portion 206 includes an integral dovetail 208 that enables the airfoil 200 to be mounted to the rotor disk, such as the fan rotor disk 42 of FIG. 1. The airfoil 200 includes a first contoured sidewall 210 and a second contoured sidewall 212. Specifically, in an embodiment, the first contoured sidewall 210 defines a pressure side 211 of the airfoil 200, and the second contoured sidewall 212 defines a suction side 213 of the airfoil 200. The sidewalls 210 and 212 are coupled together at a leading edge 214 and at an trailing edge 216. The trailing edge 216 is spaced chord-wise and downstream from the leading edge 214. The pressure side 211 and the suction side 213, and more particularly first contoured sidewall 210 and second contoured sidewall 212, respectively, each extend outward spanwise, from the root portion 206 to a tip portion 204. Alternatively, the airfoil 200 may have any conventional form, with or without the dovetail 208 or platform portion 204. For example, the airfoil 70 may be formed integrally with a rotor disk in a blisk-type configuration that does not include the dovetail 208 and the platform portion 204.

In an embodiment, and as explained in detail with regard to the first embodiment, the airfoil 200 includes a plurality of first chord sections 230 and a plurality of second chord sections 232, of which only a representative sample are shown. The first chord sections 230 and the second chord sections 232 extend generally chord-wise between the leading edge 214 and the trailing edge 216. Similar to the airfoil 70, as previously described in detail in FIGS. 3-5, each first chord section 230 is radially-spaced a distance away from an immediately adjacent second chord section 232. In an embodiment, the at least one first chord section 230 may be formed with a chord length 224 that is substantially equal to a chord length 226 of at least one second chord section 232, and including at least one of a camber, thickness, or airfoil stacking wave (e.g. dihedral). In an alternate embodiment, the at least one first chord section 230 may be formed with a chord length 224 that is longer than a chord length 226 of at least one second chord section 232 thereby defining a waveform, generally similar to waveform 105 of FIG. 3, defined by plurality of waves along the leading edge 84. In an embodiment, each first chord section 230 defines a wave tip 238 along the leading edge 214. Similarly, each second chord section 232 defines a wave trough 240 along the leading edge 214. As a result, in an embodiment, the plurality of alternating first chord sections 230 and second chord sections 232, define the waves 236, and thus the wave-like pattern or waveform 235 extending along the leading edge 214.

As previously detailed in the description for FIG. 4, the waves 236 each include a radially inner edge 244 and a radially outer edge 242. Moreover, the leading edge 214 is defined by the plurality of wave tips 238 and by the plurality of wave troughs 240. More specifically, each wave tip 238 is defined on a respective first chord section 230. Similarly, each wave trough 240 is defined on a respective second chord section 232. As a result, in an embodiment, each wave tip 238 extends, in a chord-wise direction, a distance upstream from each wave trough 240. Moreover, in an embodiment, each radially inner edge 244 and radially outer edge 242 extends generally radially between a wave tip 238 and a wave trough 240.

In an embodiment, the number of alternating adjacent first chord sections 230 and second chord sections 232 determines the number of waves 236 defined along the leading edge 214. Specifically, in an embodiment, each second chord section 232 may separated by a distance 233 from each first chord section 230, measured with respect to the radially inner edge 244. Similarly, in an embodiment, each first chord section 230 is separated by a distance 231 from each second chord section 232 measured with respect to the radially outer edge 242. The distances may be substantially zero such that the radially inner and outer edges 242 and 244, respectively, extend substantially chord-wise between the wave tip 238 and the wave trough 240. As previously detailed with regard to FIGS. 3-5, the waves 236 may be formed substantially equal, unequal, or include both equal and unequal waves. In another embodiment, the radially inner edge 244 and the radially outer edge 242 may have any plan shape that extends between the wave tip 238 and the wave trough 240 including, but not limited to a sinusoidal edge. The waves 236 may be designed to maintain an appropriate local average chord, camber and stacking (e.g. dihedral) such that the aerodynamic performance of the airfoil 200 is not penalized.

In the illustrated embodiment, the wave trough portion 240 has a length that extends generally along the leading edge 214. Similarly, in an embodiment, the wave tip portion 238 has a length that extends generally along the leading edge 214. The length of the wave trough portion 240 may be substantially zero such that the wave trough portion 240 is substantially a transition point defined between the radially inner edge 244 and the radially outer edge 242. In another embodiment, the length may be substantially zero such that the wave tip portion 238 is substantially a transition point defined between the radially inner edge 244 and the radially outer edge 242. The plurality of waves 236 are each fabricated with a pre-determined aspect ratio as previously described with regard to the airfoil 70 (FIGS. 2-10).

Figure 12:
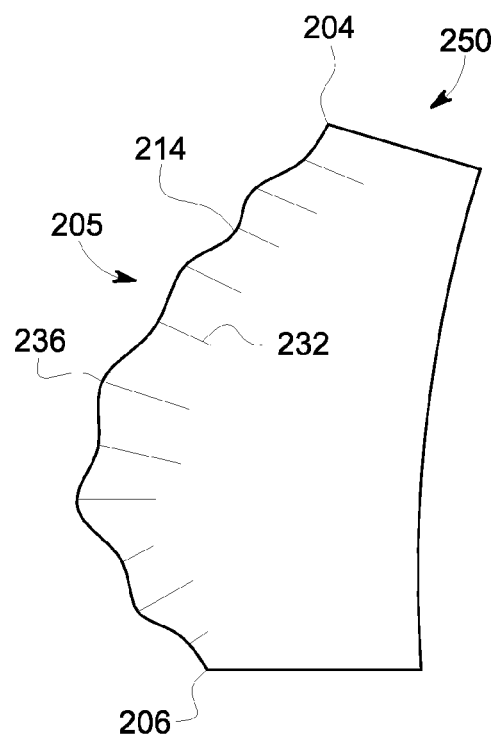
FIG. 12 is a schematic plan view of an airfoil according to an embodiment.

Referring now to FIGS. 12-15, illustrated in schematic plan views are various airfoil configurations according to embodiments disclosed herein. More particularly, illustrated in FIG. 12 is a schematic plan view of an airfoil 250. In the illustrated embodiment, airfoil 250 includes a plurality of waves 236 that comprise a waveform 235 on a leading edge 214 and a plurality of camber waves 232, both formed along substantially an entire length of the airfoil 250 in a span-wise direction. More specifically, the waveform 235 and camber waves 232 create a three-dimensional airfoil extending from the root portion 206 to the tip portion 204. In this illustrated embodiment, the plurality of waves 236 and the camber waves 232 are formed substantially equal along substantially the entire length of the airfoil in the span-wise direction. As previously described, the waves 236 are substantially equal, such that the partial spanwise wavelength of the radially inner edge 244 (FIG. 11), is substantially equal to the partial spanwise wavelength of the radially outer edge 242 (FIG. 11). An alternate embodiment may include unequal wave configurations as previously described spaced along substantially the entire length of the airfoil in the span-wise direction. In yet another alternate embodiment, the airfoil 250 may be configured having substantially equal chord sections lengths (not shown), as previously described, and including at least one of a camber, thickness, or stacking wave, thereby defining an airfoil with only a plurality of camber waves 232.

Figure 13:
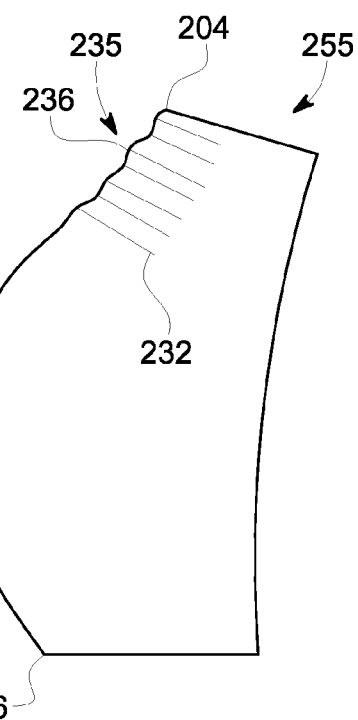
FIG. 13 is a schematic plan view of an airfoil according to an embodiment.
Figure 14:
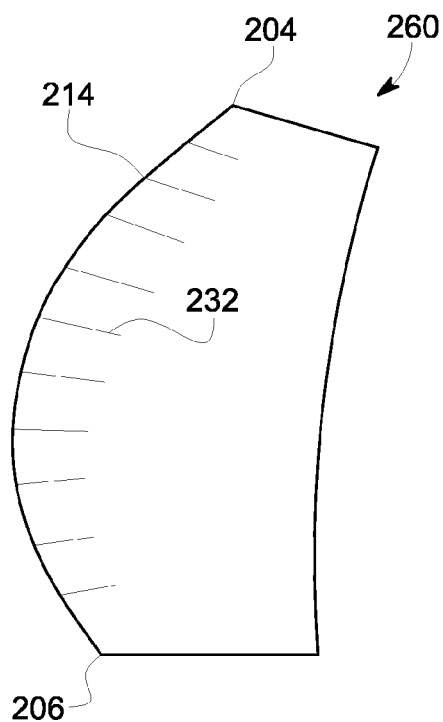
FIG. 14 is a schematic plan view of an airfoil according to an embodiment.

Illustrated in FIG. 13 is a schematic plan view of an alternate airfoil 255. In the illustrated embodiment, airfoil 255 includes a waveform 235 on a leading edge 214 and a plurality of camber waves 232, both formed along only a portion of the length of the airfoil 255 in a span-wise direction. In the illustrated embodiment, the waveform 235 and camber waves 232 are formed at a distal, or tip, end of the airfoil 255 near tip portion 204. More specifically, the waveform 235 and camber waves 232 create a three-dimensional airfoil extending from the tip portion 204 to a point along the leading edge 214 that is only a portion of the entire length of the airfoil 255 in the span-wise direction. In this illustrated embodiment, the plurality of waves 236 and camber waves 232 are equal in configuration. In an alternate embodiment, the plurality of waves 236 may be formed unequal in configuration and along only a portion of the length of the airfoil 255 in the span-wise direction. In yet another embodiment, as best illustrated in FIG. 14, an airfoil 260 may be configured having substantially equal chord sections lengths, as previously described, thereby defining an airfoil with only a plurality of camber waves 232 formed along only a portion of the entire length of the airfoil 260.

Figure 15:
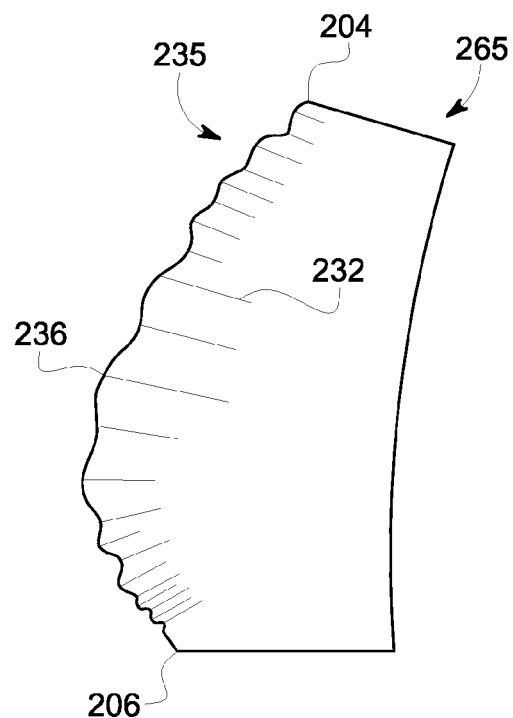
FIG. 15 is a schematic plan view of an airfoil according to an embodiment.

Illustrated in FIG. 15 is a schematic plan view of yet another alternate airfoil 265. In the illustrated embodiment, airfoil 265 includes a waveform 235 on a leading edge 214 and plurality of camber waves 232 formed along substantially the entire length of the airfoil 265 in a span-wise direction. The waveform 235 and camber waves 232 create a three-dimensional airfoil extending substantially the entire length of the airfoil 265 from the root portion 206 to the tip portion 204. In this illustrated embodiment, the plurality of waves 236 that comprise the waveform 235 and camber waves 232 are configured either equal and/or unequal, but with varying radially inner and outer edges along the length of the airfoil in the span-wise direction. More specifically, as previously described, the partial spanwise wavelengths of the radially inner edge 244 (FIG. 11) and the radially outer edge 242 (FIG. 11) are not substantially equal, nor are they equivalent. In the embodiments described herein, each airfoil configuration is designed to facilitate desensitization of the airfoil unsteady pressure response to incoming fluid gusts, as well as unsteady pressure waves (acoustic waves) impinging on the leading edge by decorrelating in time and space and reducing in amplitude the airfoil response to the plurality of wakes, vortices and waves that impinge on the leading edge of the airfoil from an upstream component, such as an upstream rotary component, stator component, or an upstream unsteady fluid inflow impinging thereupon.

Described herein is also a method of fabricating an airfoil. The method includes fabricating at least one airfoil including a first contoured sidewall, or pressure side and a second contoured sidewall, or suction side coupled together at a leading edge and a trailing edge, wherein the airfoil includes a plurality of first and second chord sections each extending between the leading and trailing edges. At least one of the first chord sections extends outward from one of the first contoured sidewall or the second contoured sidewall of the airfoil at the leading edge, and at least one of the second chord sections extends outward from one of the first contoured sidewall or the second contoured sidewall of the airfoil at the leading edge. The plurality of first chord sections defining at least one first chord length. The plurality of second chord sections defining at least one second chord length, each extending between the trailing and leading edges, wherein said first chord length may be longer than the second chord length. The airfoil further includes a plurality of first chord sections having a first chord thickness, and a plurality of second chord sections having a second chord thickness.

The above-described three-dimensional wavy leading edge airfoils effectively desensitize the blade response to an impinging fluid gust or wake and facilitate reducing the noise and aeromechanical loading generated during engine operation. During engine operation, the airfoils may be subject to impinging wakes and vortices from an upstream object or unsteady inlet flow that generate noise and aeromechanical loading when the wake impinges on the airfoil. In an embodiment, each airfoil includes a leading edge that includes a plurality of wave-shaped projections, or waves. Moreover, in such an embodiment, the plurality of waves define a plurality of tips and troughs along the leading edge and a plurality of camber waves on the airfoil, resulting in a three-dimensional crenulated airfoil. The airfoil leading edge waves and camber waves facilitate desensitizing of the airfoil by decorrelating and reducing the amplitude of the airfoil unsteady response to impinging wakes and vortices. More specifically, the airfoil leading edge waves and camber waves facilitate both decorrelation and amplitude reduction of unsteady pressures generated by the wakes impinging on the airfoil by modifying the arrival time of the vorticity in the impinging airflow, modifying the airfoil unsteady pressure loading at the leading edge to be spatially less coherent than a conventional leading edge and minimizing the adverse effect of the leading edge suction peak and improving the unsteady pressure response of the airfoil, and altering the time-averaged loading of the airfoil such that the unsteady response about the modified time-averaged loading is reduced and less coherent.

The leading edge configured in this manner addresses the unsteady aerodynamic and aeroacoustic response of a blade, vane or general aerodynamic surface to a relative unsteady incoming flow disturbance. More specifically, the leading edge configured as described herein facilitates reducing the magnitude of the airfoil unsteady pressure response to wakes and vortices impinging on the leading edge of the airfoil such that the noise and aeromechanical loading are facilitated to be reduced. The decorrelation and reduction in amplitude of the unsteady pressure response to impinging wakes may facilitate reducing the axial distance necessary between the airfoils and upstream components. As a result, engine efficiency and performance are facilitated to be improved in comparison to engines using standard airfoils without a plurality of waves and camber waves defined on at least a portion of a leading edge of at least one airfoil. In addition, the reduction in radiated noise and aeromechanical loading are achieved without an increase in blade or vane weight, without substantially decreasing aerodynamic performance, and without any otherwise impact on the overall engine system (length, weight, structure, etc.). In an embodiment, the wavy leading edge design disclosed herein may allow for a change in engine design that would normally increase noise if a conventional airfoil leading edge were used (e.g., reduced fan-OGV axial spacing, reduced fan diameter, increased fan tip speed, reduced OGV sweep, etc.) but allow for maintenance of target noise levels while gaining overall system performance.

Exemplary embodiments of airfoils including fan blades and guide vanes are described above in detail. The airfoils are not limited to the specific embodiments described herein, but rather, may be applied to any type of airfoil that are subjected to impinging wakes and vortices from an upstream object, such as a fan blade, stator, airframe, or an unsteady fluid flow. The airfoils described herein may be used in combination with other blade system components with other engines.

The invention claimed is:

1. An airfoil comprising:
a first side and a second side coupled together at a leading edge and a trailing edge, wherein the leading edge extends an entire length of the airfoil in a span-wise direction and the trailing edge is spaced chord-wise and downstream from the leading edge, the airfoil configured to facilitate desensitization of an airfoil unsteady pressure response to at least one impinging upstream generated wake or vortex by reducing in amplitude and decorrelating spatially and temporally an unsteady pressure caused by interaction of the airfoil with the at least one impinging upstream generated wake or vortex; and
a plurality of first chord sections defining at least one first chord length and a plurality of second chord sections defining at least one second chord length, the plurality of first chord sections and second chord sections defining a waveform along a leading edge of the airfoil, at least one chord section of said plurality of first chord sections extending outward from one of the first side or the second side of the airfoil at the leading edge and extending only a partial width of the airfoil in a chord-wise direction and at least one chord section of said plurality of second chord sections extending outward from one of the first side or the second side of the airfoil at the leading edge and extending only a partial width of the airfoil in a chord-wise direction, said leading edge comprises:
a plurality of spaced-apart wave-shaped projections each wave-shaped projection of said plurality of wave-shaped projections defines a wave tip and at least one trough portion defined between at least one pair of adjacent spaced-apart wave-shaped projections, wherein adjacent wave-shaped projections define a tip-to-tip distance therebetween, the tip-to-tip distance is within a range of values representative of a percentage of the at least one first chord length, wherein each of said wave-shaped projections include a radially inner edge and a radially outer edge that are angled such that they maintain the leading edge to the impinging upstream generated wake or vortex and wherein said wave-shaped projections are at least one of substantially evenly spaced and unevenly spaced,
wherein the outwardly extending first and second chord sections and the plurality of spaced-apart wave-shaped projections defining a three-dimensional crenulated airfoil.

2. An airfoil in accordance with claim 1, wherein said airfoil is configured to minimize adverse effects of a high flow acceleration around the leading edge.

3. An airfoil in accordance with claim 1, further comprising a thickness measured between said first and second sides extending from said leading edge to said trailing edge, said airfoil thickness varies in a span-wise direction.

4. An airfoil in accordance with claim 1, wherein said plurality of first chord sections has a first thickness and said plurality of second chord sections has a second thickness, each first chord section of said plurality of first chord sections is defined between each second chord section of said plurality of second chord sections.

5. An airfoil in accordance with claim 1, wherein the first chord length is longer than the second chord length.

6. An airfoil in accordance with claim 1, wherein the plurality of spaced-apart wave-shaped projections are formed along only a portion of the airfoil in a span-wise direction.

7. An airfoil in accordance with claim 1, wherein the plurality of spaced-apart wave-shaped projections are formed along substantially an entire length of the airfoil in a span-wise direction.

8. An airfoil in accordance with claim 1, wherein the plurality of spaced-apart wave-shaped projections are unequal.

9. An airfoil in accordance with claim 1, wherein the plurality of spaced-apart wave-shaped projections are equal.

10. An airfoil in accordance with claim 1, wherein a portion of the plurality of spaced-apart wave-shaped projections are equal and a portion of the spaced-apart wave-shaped projections are unequal.

11. An airfoil in accordance with claim 1, wherein said airfoil is a stationary guide vane.

12. An airfoil in accordance with claim 1, wherein said airfoil is a rotating blade.

13. An airfoil for use in an engine, said airfoil comprising:
a first side and a second side coupled together at a leading edge and a trailing edge, wherein the leading edge extends an entire length of the airfoil in a span-wise direction and the trailing edge is spaced chord-wise and downstream from the leading edge, the airfoil configured to facilitate desensitization of an airfoil unsteady pressure response to at least one impinging upstream generated wake or vortex by reducing in amplitude and decorrelating spatially and temporally an unsteady pressure caused by interaction of the airfoil with the at least one impinging upstream generated wake or vortex; and
a plurality of first chord sections having a first thickness and defining at least one first chord length and a plurality of second chord sections having a second thickness and defining at least one second chord length, wherein each first chord section of said plurality of first chord sections is defined between each second chord section of said plurality of second chord sections and wherein the first chord length is longer than the second chord length defining a waveform along a leading edge of the airfoil, at least one chord section of said plurality of first chord sections extends outward from one of the first side or the second side of the airfoil at the leading edge and extending only a partial width of the airfoil in a chord-wise direction, and at least one chord section of said plurality of second chord sections extends outward from one of the first side or the second side of the airfoil at the leading edge and extending only a partial width of the airfoil in a chord-wise direction, said leading edge comprises:
a plurality of spaced-apart wave-shaped projections each wave-shaped projection of said plurality of wave-shaped projections defines a wave tip and at least one trough portion defined between at least one pair of adjacent spaced-apart wave-shaped projections, wherein adjacent wave-shaped projections define a tip-to-tip distance therebetween, the tip-to-tip distance is within a range of values representative of a percentage of the at least one first chord length, wherein each of said wave-shaped projections include a radially inner edge and a radially outer edge that are angled such that they maintain the leading edge to the impinging upstream generated wake or vortex and wherein said wave-shaped projections are at least one of substantially evenly spaced and unevenly spaced,
wherein the outwardly extending first and second chord sections and the plurality of spaced-apart wave-shaped projections defining a three-dimensional crenulated airfoil.

14. An airfoil in accordance with claim 13, further comprising a thickness measured between said first and second sides extending from said leading edge to said trailing edge, said airfoil thickness varies in a span-wise direction.

15. An airfoil in accordance with claim 13, wherein the plurality of spaced-apart wave-shaped projections are formed along one of a portion of the airfoil in a span-wise direction or along substantially an entire length of the airfoil in a span-wise direction.

16. An airfoil in accordance with claim 13, wherein said airfoil is one of an outlet guide vane, a fan blade, a rotor blade, a stator vane, a ducted fan blade, an unducted fan blade, a strut, a nacelle inlet, a wind turbine blade, a propeller, an impeller, a diffuser vane or a return channel vane.

17. A method of fabricating an airfoil, said method comprising:
fabricating at least one airfoil including a first side and a second side coupled together at a leading edge and a trailing edge, wherein the leading edge extends an entire length of the airfoil in a span-wise direction and the trailing edge is spaced chord-wise and downstream from the leading edge, the airfoil configured to facilitate desensitization of an airfoil unsteady pressure response to at least one impinging upstream generated wake or vortex by reducing in amplitude and decorrelating spatially and temporally an unsteady pressure caused by interaction of the airfoil with the at least one impinging upstream generated wake or vortex; and
wherein the airfoil includes a plurality of first chord sections defining at least one first chord length and a plurality of second chord sections defining at least one second chord length, each extending between the trailing and leading edges and defining a waveform along a leading edge of the airfoil, at least one chord section of said plurality of first chord sections extends outward from one of the first side or the second side of the airfoil at the leading edge and extending only a partial width of the airfoil in a chord-wise direction, and at least one chord section of said plurality of second chord sections extends outward from one of the first side or the second side of the airfoil at the leading edge and extending only a partial width of the airfoil in a chord-wise direction, said leading edge defines a length between a root portion of said airfoil and a tip portion of said airfoil, said leading edge comprises:
a plurality of spaced-apart wave-shaped projections each wave-shaped projection of said plurality of wave-shaped projections defining a wave tip and at least one trough portion defined between at least one pair of adjacent spaced-apart wave-shaped projections, wherein adjacent wave-shaped projections define a tip-to-tip distance therebetween, the tip-to-tip distance is within a range of values representative of a percentage of the at least one first chord length, wherein said wave-shaped projections include a radially inner edge and a radially outer edge that are angled such that they maintain the leading edge to the impinging upstream generated wake or vortex and wherein said wave-shaped projections are at least one of substantially evenly spaced and unevenly spaced,
wherein the outwardly extending first and second chord sections and the plurality of spaced-apart wave-shaped projections defining a three-dimensional crenulated airfoil.

18. A method in accordance with claim 17, wherein fabricating the at least one airfoil further comprises fabricating the airfoil such that the airfoil includes a thickness measured between the first and second sides extending between the leading and trailing edges, the airfoil thickness varies in a span-wise direction.

19. A method in accordance with claim 17, wherein fabricating the at least one airfoil further comprises fabricating the airfoil such that the airfoil is formed with a plurality of first chord sections having a first thickness and a plurality of second chord sections having a second thickness, each first chord section of said plurality of first chord sections are each defined between each second chord section of said plurality of second chord sections.

20. A method in accordance with claim 17, wherein said airfoil is one of an outlet guide vane, a fan blade, a rotor blade, a stator vane, a ducted fan blade, an unducted fan blade, a strut, a nacelle inlet, a wind turbine blade, a propeller, an impeller, a diffuser vane, a return channel vane, flap leading edges, wing leading edges, or landing gear fairings.

* * * * *